Jan. 22, 1929.

C. H. McKAY 1,699,747

SAW TOOTH CONSTRUCTION

Filed July 27, 1927

Inventor
Charles H. McKay
by Roberts Cushman & Woodbury
Att'ys

Patented Jan. 22, 1929.

1,699,747

UNITED STATES PATENT OFFICE.

CHARLES H. McKAY, OF FITCHBURG, MASSACHUSETTS, ASSIGNOR TO SIMONDS SAW AND STEEL COMPANY, OF FITCHBURG, MASSACHUSETTS, A CORPORATION OF MASSACHUSETTS.

SAW-TOOTH CONSTRUCTION.

Application filed July 27, 1927. Serial No. 208,738.

This invention relates to an improvement in saws and is more particularly applicable to saws having inserted teeth, which are used with abrasive for cutting stone or the like, and in some aspects comprises an improvement upon the similar construction shown in my copending application No. 192,612, filed May 19, 1927.

The present invention discloses an improved form of fastening means for firmly securing inserted teeth in place upon the edge or periphery of the saw plate or disk. This fastening means permits a considerable portion of each of the saw teeth to bear upon a substantially circumferential surface of the saw disk and permits reliance upon the metal of the saw plate itself in cooperation with the metal of the tooth base to hold the tooth in place, an auxiliary wedge and cooperating interfitting parts being depended upon to hold the saw teeth in proper position upon the plate. The edges of the teeth have grooved portions which permit location of the wedges in their operative position and which also constitute guideways for directing abrasive such as shot toward the cutting edges of the teeth. Furthermore tooth fastening means of this character permits the assembly of teeth upon the saw plate, or their removal and replacement with ordinary tools and without requiring especial care or accurate workmanship.

The above and further advantageous features of the invention will be apparent to those skilled in the art upon a reading of the subjoined description and claims in conjunction with the accompanying drawings in which Fig. 1 is an elevational view of a portion of a disk saw having teeth mounted in the preferred manner;

Figure 1:
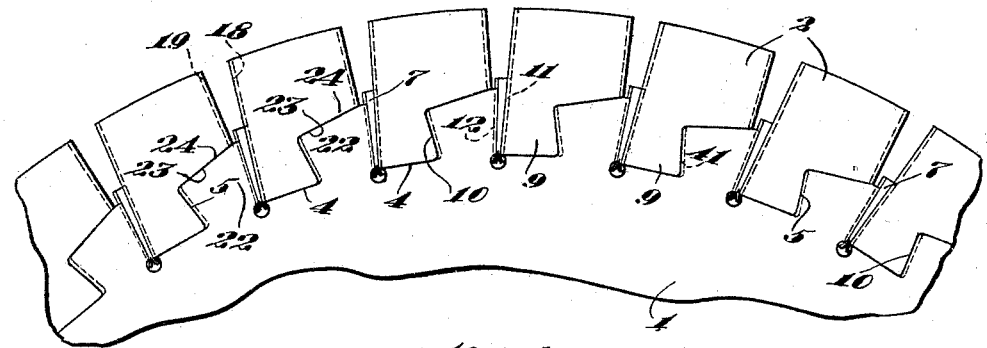

The accompanying drawings, which exemplify the present invention, show a saw plate or disk 1 which has teeth 2 inserted at its edge. The plate is provided with peripheral notches 4 each of which has an undercut portion 5 formed by making one wall, e.g. the rear wall, of the notch inclined at an acute angle to the radius of the disk. The opposite wall of the notch 4 may extend substantially in a radial direction but preferably is grooved to engage a suitable wedge 7.

Figures 2, 3, 4:
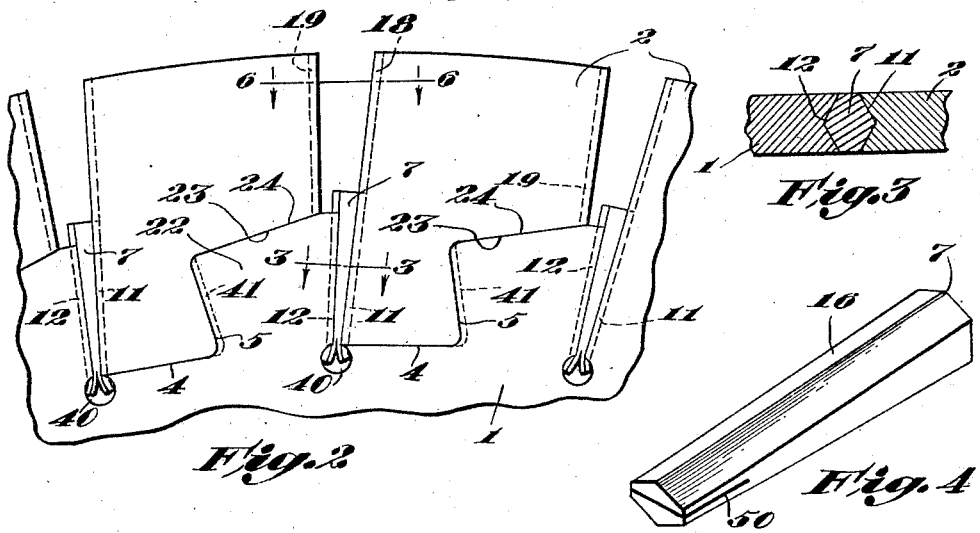
Fig. 2 is an elevational detail of a portion of the saw teeth and the securing means for the same.
Fig. 3 is an enlarged section on line 3—3 of Fig. 2.
Fig. 4 is an enlarged elevational view of the key or wedge for retaining the teeth in place.

Each tooth comprises a body portion which is located outwardly of the outmost portion of the disk 1 and a base portion 9 which is adapted to engage the notch 4 and which has a rearwardly inclined surface 10 adapted to fit the undercut 5, thus the base portion of each tooth is of substantially trapezoidal form as viewed in side elevation. A suitable tongue 41 upon this edge may engage a groove in the undercut portion 5 of the notch, if desired, in order to provide additional lateral support. The front portion of the base 9 of each tooth is provided with a groove 11 which may correspond to the groove 12 in the adjoining wall of the notch. Between the grooves 11 and 12 is normally located the wedge member 7 which may preferably be of the form disclosed in Figs. 3 and 4, having parallel side faces which may be spaced transversely at a distance substantially corresponding to the similar dimensions of the saw plate and teeth, and having front and rear portions defined by faces 16 which meet each other at an obtuse angle and which are adapted to engage complementarily shaped portions of grooves 11 and 12. The key 7 is slightly tapered so that it may be driven between the grooves 11 and 12 in order to force the portion 10 of the tooth firmly against the undercut 5 of the plate in order to lock the tooth firmly in place. In order to permit interposition of the wedge between the plate and tooth base in this manner, an adjoining portion of the tooth edge is grooved as designated by numeral 18 in order to provide an extension of groove, while, if desired, the rear edge of each tooth may be grooved as designated by numeral 19. These grooves form guideways for the abrasive such as shot with which the saw may be used when cutting stone or the like, so that this material is cast outwardly to the cutting edges of the tooth.

The inner end of the wedge is split as designated by numeral 50 while the keyway is defined by a transverse opening 40 in the plate. This opening has a diameter larger than the corresponding dimension of the keyway so that the split end portions of the key normally tend to spread therein when it is driven firmly in place; if desired, these portions of the key may be still further spread by use of a suitable tool so that the parts are firmly retained in place. The opening 40 permits manufacture of the key and cooperating grooves within reasonable mechanical tolerances and ready removal of the wedge by interposition of a suitable tool to engage the split end 50 of the wedge.

The undercut form of notch and the complementarily shaped tooth base compose unusually sturdy means for holding the tooth in place; the wedge 7 is held against sidewise movement by the arrangement of surfaces 16 and grooves 18 and 19, and from endwise movement by its spread ends.

Defining the notches 4 are the spaced plate extensions 22 which are provided with outer face portions 23 which extend longitudinally in a direction which is substantially tangential to that portion of the saw disk. Each tooth is provided with a surface 24 which is adapted to bear radially upon surface 23 while the bottom of base portion 9 bears upon the bottom of the notch so that each tooth has a large surface area bearing directly upon peripheral surfaces of the saw plate, thus providing sturdy means for receiving the shock and impacts due to the cutting action. The front edge of each tooth is inclined slightly to the radial direction in the conventional manner and the rear edge of the tooth may extend substantially radially, as shown.

Figures 5, 6:
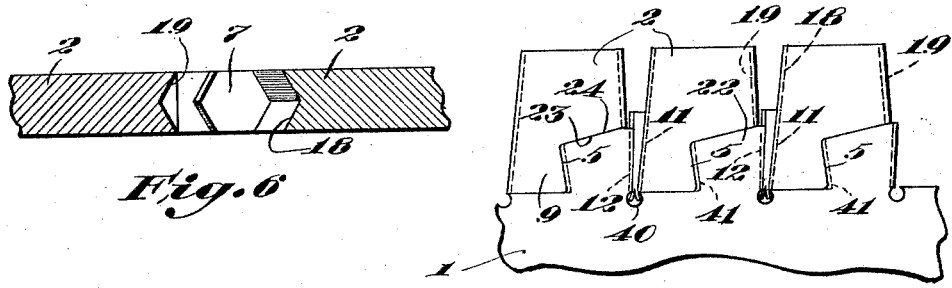
Fig. 5 is a view corresponding to Fig. 2, but showing a straight saw plate with teeth mounted in the preferred manner.
Fig. 6 is a section on line 6—6 of Fig. 2.

Fig. 5 illustrates a similar form of tooth mounting as applied to the edge of a straight saw plate designed for reciprocating rather than rotative movement. In this form of saw the grooves 19 at the backs of teeth are particularly advantageous in casting the shot outwardly to the cutting portions of the teeth rather than pushing it out laterally.

I claim:

1. A saw construction comprising a saw plate having a series of notches at its edge, said notches being undercut, and having a bottom wall extending in the same general direction as the adjoining edge of the plate, saw teeth having a base portion adapted to engage undercut portions of the notches and to bear upon the bottom walls of the same, a portion of each tooth having a tongue and groove engagement with a wall of the notch to prevent relative lateral movement, gradually tapered keys engaged with the base portions opposite the undercuts and retaining them against the same, and means integral with and at the inner ends of the keys to lock the keys in place.

2. A saw construction comprising a saw plate having a series of notches at its edge, said notches being undercut, saw teeth having base portions adapted to engage the undercut portions of the notches, and wedge members to hold the teeth in engagement with said undercuts, the inner ends of the wedges being split and spread to engage recesses in the plate to lock the parts in place.

3. A saw construction comprising a saw plate having a series of notches at its edge, said notches being undercut, saw teeth having base portions adapted to engage the undercut portions of the notches, wedge members engageable with the side of each base portion opposite the undercut and adapted to press the base portions firmly against the same, the inner ends of the wedges being expanded to engage recesses in the plate to lock the parts in place, and openings in the plate providing access to said recesses to permit insertion of a tool for disengagement of the wedges and recess.

4. A saw construction comprising a saw plate having a series of notches at its edge, said notches being undercut, saw teeth having base portions adapted to engage the undercut portions of the notches, wedge members engageable with the side of each base portion opposite the undercut and adapted to press the base portions firmly against the same, the inner ends of the wedges being split, and transverse openings in the plate at the bottoms of the keyway to engage the spread end portions of the wedges.

Signed by me at Fitchburg, Massachusetts, this 23rd day of July, 1927.

CHARLES H. McKAY.